United States Patent
Tokuda et al.

(10) Patent No.: US 6,778,467 B2
(45) Date of Patent: Aug. 17, 2004

(54) UNDERWATER SOUNDING APPARATUS

(75) Inventors: Koji Tokuda, Nishinomiya (JP); Shinji Ishihara, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 0 days.

(21) Appl. No.: 10/234,191

(22) Filed: Sep. 5, 2002

(65) Prior Publication Data

US 2003/0056592 A1 Mar. 27, 2003

(30) Foreign Application Priority Data

Sep. 10, 2001 (JP) ........................................ 2001-273157

(51) Int. Cl.⁷ .......................... G01S 15/89; G01S 15/96; G01S 3/80
(52) U.S. Cl. .............................. 367/97; 367/904; 367/88
(58) Field of Search ............................. 367/97, 904, 88

(56) References Cited

U.S. PATENT DOCUMENTS 4,586,172 A * 4/1986 Vernet et al. ............... 367/904
4,712,200 A * 12/1987 Cassou ....................... 367/904
4,980,868 A * 12/1990 Teel ............................ 367/904

FOREIGN PATENT DOCUMENTS

| EP | 0093057 A | * 11/1983 | ........... G01S/15/52 |
| GB | 2364569 A |    1/2002  |                       |
| GB | 2379980 A | *  3/2003 | ........... G01S/15/89 |
| JP | 10-132930 A |  5/1998  |                       |
| JP | 2001273157 | *  3/2003 | ........... G01S/15/96 |

* cited by examiner

Primary Examiner—Daniel Pihulic
(74) Attorney, Agent, or Firm—Birch, Stewart, Kolasch & Birch, LLP

(57) ABSTRACT

A mixer shifts the center frequency of a received signal to a baseband according to a center frequency detected by a center frequency detector or a center frequency estimated from ship speed, for example, by a center frequency estimator. The passband of a variable passband filter varies according to a bandwidth detected directly from the received signal by a bandwidth detector or a bandwidth estimated from the pulselength of a transmitting signal by a bandwidth estimator, whereby the bandwidth of a baseband signal output from the mixer is limited to remove undesired noise components in the received signal.

21 Claims, 12 Drawing Sheets

UNDERWATER SOUNDING APPARATUS

BACKGROUND OF THE INVENTION

1. Field of the Invention

The present invention relates to an underwater sounding apparatus, such as a scanning sonar.

2. Description of the Prior Art

FIG. 12 illustrates a general principles of using a scanning sonar to perform sounding of underwater situations. Referring to the Figure, designated by the letter A is an underwater sounding apparatus installed on a ship S, designated by the letter T is a cylindrical transducer unit of the underwater sounding apparatus A, designated by the letter Bs is a transmitting beam of ultrasonic waves formed by the transducer unit T, designated by the letter Br is a receiving beam for receiving reflected echoes from underwater objects such as fish which reflect the ultrasonic waves, and designated by the letter Z is a water surface. The transmitting beam Bs is transmitted underwater simultaneously in all directions around the transducer unit T, forming an omnidirectional umbrella-like beam pattern directed obliquely downward with a specific tilt angle. On the other hand, the receiving beam Br is a rotating beam having specific directivity. This rotating beam is produced by successively switching elements of the transducer unit T around its outer cylindrical surface, causing the beam to scan over 360° at a high speed in a spiral pattern. The receiving beam Br thus produced receives the reflected echoes from the underwater objects, and the information on the underwater situation, such as distribution and movements of fish schools, is obtained by analyzing received signals.

FIG. 10 is a block diagram showing the configuration of functional units of a conventional scanning sonar, which comprises a transducer unit 51, a transmitter 52, a transmit-receive (TR) circuit 53 as well as a receiver section including blocks 54 to 61. The transducer unit 51 transmits ultrasonic waves into the water and receives return echoes. The construction of the transducer unit 51 is conventional, including a plurality of ultrasonic transducer elements arranged on an outer surface of a cylindrical structure. The transmitter 52 produces a pulsed transmitting signal, which has a specific pulselength, and delivers it to the transducer unit 51. The TR circuit 53 is a circuit for switching signal paths between transmit and receive cycles. Specifically, the TR circuit 3 allows the transmitting signal to pass into the transducer unit 1 while prohibiting the transmitting signal from entering the receiver section during each successive transmit cycle and permits only the received signals to enter the receiver section during each successive receive cycle.

Designated by the numeral 54 is a first fixed-band bandpass filter provided in the receiver section, which has a fixed passband. This filter 54 is provided to take out signals in only a desired frequency range from among echo signals received by the transducer unit 51. Designated by the numeral 55 is an amplifier for amplifying the received signals, which have passed through the fixed-band bandpass filter 54. Designated by the numeral 56 is a frequency converter formed of a mixer for converting the amplified received signals from an original ultrasonic frequency to an intermediate frequency. Designated by the numeral 57 is a second fixed-band bandpass filter having a fixed passband for removing unwanted sideband signal components contained in the frequency-converted signals to further narrow the frequency range of the received signals. Designated by the numeral 58 is an amplifier for amplifying the filtered received signals up to a rated input level of an analog-to-digital (A/D) converter 59 provided in a succeeding stage. The A/D converter 59 converts the amplified received signals into a digital signal. Designated by the numeral 60 is a beamformer for forming a rotating receiving beam which successively scans the received signals incoming from all directions around the transducer unit T. Further, designated by the numeral 61 is a detector for detecting an envelope (or a combined echo signal) from a combined received signal produced by beamforming based on a phased array technique. An output of the detector 61 is sent to an indicator which is not illustrated.

In the scanning sonar thus constructed, the transmitter 52 supplies the pulsed transmitting signal of a specific frequency to the transducer unit 51 through the TR circuit 53. The transducer unit 51 converts this pulse signal and emits a beam of ultrasonic waves into the water. The transmitted ultrasonic waves are reflected by fish or other underwater objects and the transducer unit 51 receives return echoes. The transducer unit 51 converts these ultrasonic echo signals into electric signals, which are sent to the receiver section as received signals. The first fixed-band bandpass filter 54 in the receiver section removes undesired noise components contained in the received signals, allowing signal components falling within only the specific frequency range to pass through. The received signals which have passed through the fixed-band bandpass filter 54 are amplified by the amplifier 55 and converted into signals of an intermediate frequency (IF) by the frequency converter 56. Then, the second fixed-band bandpass filter 57 removes sideband signal components from the IF signals. The filtered received signals are further amplified by the amplifier 58 and converted into the digital signal by the A/D converter 59. The beamformer 6D forms a receiving beam which is steered over 360° in a spiral pattern. The combined received signal is sent to the detector 61 which detects the envelope of the received signal to reproduce the echo signal. Echo data thus produced is output to the indicator in a succeeding stage. The indicator produces and displays an image of target echoes showing underwater situations on-screen using the data fed from the detector 61.

In the conventional scanning sonar of FIG. 10, the frequency band of the received signal is primarily limited by the first fixed-band bandpass filter 54, and finally defined by the second fixed-band bandpass filter 57. In this respect, it is to be noted that the frequency of the received signal does not necessarily remain constant, but can shift due to factors such as ship speed and motion, tide and waves. FIG. 11 is a diagram illustrating frequency shifts (Doppler shifts) of the received signal caused by a change in ship speed, in which the ship S equipped with the aforementioned scanning sonar is running in the direction of an arrow K. In FIG. 11, (a) to (e) show frequency spectra of different signals. Specifically, (a) shows the frequency spectrum of the transmitting signal transmitted by the scanning sonar, (b) shows the frequency spectrum of a received signal obtained from an echo reflected by a target at point P ahead of the ship S, (c) shows the frequency spectrum of a received signal obtained from an echo reflected by a target at point Q on the right side of the ship S, (d) shows the frequency spectrum of a received signal obtained from an echo reflected by a target at point R behind the ship S, and (e) shows frequency characteristics of the fixed-band bandpass filter 57.

Since the ship S is approaching the point P, the center frequency fa of the received signal from this point P is shifted by f to the positive side from the center frequency fo of the transmitting signal due to the Doppler effect, as shown in (b) of FIG. 11. Also, since the point Q is situated at the same longitudinal location with the ship S (i.e., along its direction of motion), the center frequency of the received signal from this point Q is equal to the center frequency fo, unaffected by the Doppler effect, as shown in (c) of FIG. 11. On the other hand, since the ship S is receding from the point R, the center frequency fb of the received signal from this point R is shifted by f to the negative side from the center frequency fo of the received signal due to the Doppler effect, as shown in (d) of FIG. 11.

As the amount of frequency shift changes with respect to the direction of each individual target relative to the ship S (transducer unit 51), the fixed-band bandpass filter 57 should be of a type having a wide passband w as shown in (e) of FIG. 11 to cover frequency shifts of the received signals from targets in all directions. If the passband of fixed-band bandpass filter 57 is simply widened, however, there arises the problem that the sounding range of sonar decreases due to increases in underwater noise and electrical noise of the sonar system. One potential approach to overcoming this problem would be to increase output power of the scanning sonar. This approach, however, produces another problem in that both the physical size of the sonar and its power consumption increase. While the foregoing discussion has dealt with the frequency shift that occurs in connection with the ship speed, the same discussion applies to frequency shifts occurring due to other external factors, such as ship motion, tide and waves.

In an attempt to overcome the aforementioned problems, Japanese Examined Patent Publication No. 2875118 proposes an ultrasonic sounding apparatus capable of shifting the center frequency of a filter passband according to the amount of Doppler shift, or ship speed, by use of a fixed-band bandpass filter of which center frequency is variable. According to this method, even when the amount of Doppler shift varies, the center frequency and fixed passband of the filter shifts correspondingly and, therefore, it is possible to perform a filtering operation optimized for variations in the frequency of the received signal, thereby maintaining an intended sounding capability.

The sounding apparatus of the aforementioned Patent Publication calculates the amount of Doppler shift from the ship speed and the direction of a sounding beam, and correspondingly shifts the center frequency of the passband of the filter. Therefore, although it is possible to shift the center frequency of the passband to compensate for changes in the ship speed, it is impossible to cancel out frequency shifts caused by other factors, such as ship motion, tide and waves. Because the ship's hull produces motion on six axes due to waves even when the ship is at anchor, the frequency shifts occur as a consequence. It is, however, impossible to obtain the amount of frequency shift by the prior art method of the aforementioned Patent Publication when the ship speed is zero. Furthermore, when the filtering operation is performed based on the ship speed, it is necessary to continuously obtain ship speed data from external equipment.

In addition, because the passband of the filter is fixed in the aforementioned sounding apparatus, it is impossible to compensate for variations in the frequency range of the received signal when such variations occur from one direction to another, thus imposing limitations on efforts to improve signal-to-noise ratio (SNR). Moreover, because the aforementioned sounding apparatus executes the filtering operation prior to the beamforming operation, it is not possible to make the passband of the filter extremely narrow. Rather, it is necessary to provide multiple stages of fixed-band bandpass filters for reducing the frequency range of the received signal. Providing a number of filters this way results in complexity in circuit configuration and an eventual cost increase.

SUMMARY OF THE INVENTION

In light of the aforementioned problems of the prior art, it is an object of the invention to provide an underwater sounding apparatus, which can compensate for frequency shifts of received signals occurring in different individual directions due to various factors, while maintaining a high SNR. Another object of the invention is to provide an underwater sounding apparatus having a capability to controllably shift the bandwidth of echo signals received from all directions using only a single filter.

According to a principal feature of the invention, an underwater sounding apparatus comprises a transducer for transmitting ultrasonic waves into water and receiving ultrasonic echoes reflected from underwater, an indicator for displaying information on underwater situations based on received signals obtained from the ultrasonic echoes, a center frequency detector for detecting the center frequency of the received signal obtained from each direction, a bandwidth detector for detecting the bandwidth of the received signal obtained from each direction, a frequency shifter for shifting the center frequency of the received signal obtained from each direction based on the center frequency detected by the center frequency detector to obtain a baseband signal from the received signal, and a variable passband filter whose passband varies according to the bandwidth detected by the bandwidth detector, whereby the bandwidth of the baseband signal is limited by the passband.

Since the center frequencies of the signals received from the individual directions are determined directly from the received signals, it is possible to cancel out frequency shifts caused not only by changes in ship speed, but also by other factors. Furthermore, because the passband of the variable passband filter varies according to the bandwidth determined from the received signals, it is possible to perform a filtering operation optimized for variations in the frequency range of the received signals even when such variations occur from different directions. This makes it possible to remove undesired noise components contained in the received signals and improve the SNR. Moreover, because the different center frequencies of the signals received from different directions are shifted to the frequency range of the baseband signal, and the bandwidth of the received signals is adjusted by the variable passband filter after fixing the frequency range of the received signals, it is possible to control the bandwidth of the echo signals received from all directions with a single filter without the need for multiple variable passband filters.

According to the invention, the underwater sounding apparatus may further comprise a center frequency estimator for calculating a Doppler shift frequency of the received signal based on ship speed, and estimating the center frequency of the received signal from the calculated Doppler shift frequency. In this embodiment, a first selector chooses whether to use the center frequency detected by the center frequency detector or the center frequency estimated by the center frequency estimator, and the center frequency of the received signal obtained from each direction is shifted to its baseband based on the center frequency chosen by the first selector.

According to the invention, the underwater sounding apparatus may further comprise a bandwidth estimator for estimating the bandwidth of the received signal based on the pulselength of a transmitting signal applied to the transducer. In this construction, a second selector chooses whether to use the bandwidth detected by the bandwidth detector or the bandwidth estimated by the bandwidth estimator, and the passband of the variable passband filter is varied according to the bandwidth chosen by the second selector to adjust the bandwidth of the baseband signal to an optimum range.

The underwater sounding apparatus of the invention may be constructed such that the first selector chooses the center frequency estimated by the center frequency estimator when the accuracy of the center frequency of the received signal detected by the center frequency detector for each direction does not satisfy a specific criterion. This makes it possible to use the estimated center frequency when the center frequency of the received signal cannot be determined with high accuracy due to aeration (air bubbles) in the wake of a ship, for example.

In one form of the invention, the second selector chooses the bandwidth according to a setting entered through an operator terminal. This enables an operator to determine whether to use the bandwidth detected by the bandwidth detector or the bandwidth estimated by the bandwidth estimator.

In one preferred form of the invention, the underwater sounding apparatus further comprises a beamformer which forms a rotating receiving beam for scanning the received signals in an upstream stage of the frequency shifter and the variable passband filter. According to this construction, the bandwidth of the received signal after beamforming operation is narrower than the received signal before the beamforming operation. Therefore, it is possible to make the passband of the variable passband filter considerably narrow and further improve the SNR.

According to the invention, the underwater sounding apparatus may further comprise an audio signal generator which generates an audio signal from an output signal of the variable passband filter. This enables the operator to recognize the presence and movement of fish schools not only visually, but also audibly.

The audio signal generator may include a first audio mixer for inversely shifting the center frequency of the received signal, which has been picked up from a specific audio monitoring direction and frequency-shifted to its baseband (as much as the Doppler shift frequency), and a second audio mixer for shifting the center frequency of an output signal of the first audio mixer to a frequency range best suited as an audio signal. This makes it possible to obtain a "Doppler-shifted" audio output in accordance with the relative moving speed of fish targets.

According to the invention, it is preferable to use a complex autocorrelation method in detecting the center frequency and the bandwidth of the received signal obtained from each direction. This makes it possible to detect the center frequency and the bandwidth of the received signal in real time with a simple circuit configuration.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
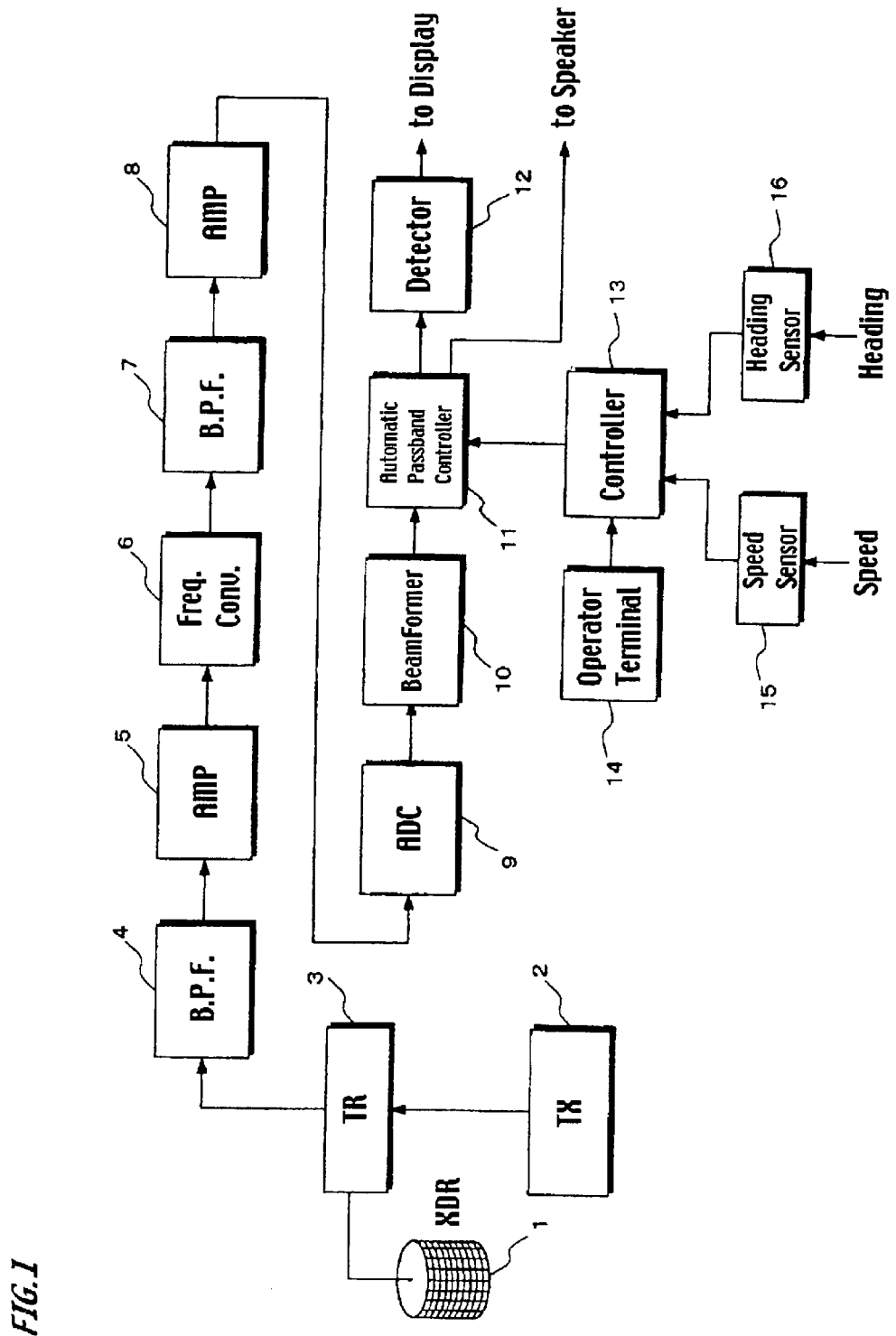
FIG. 1 is a block diagram showing the configuration of a scanning sonar according to a preferred embodiment of the invention.
Figure 12:
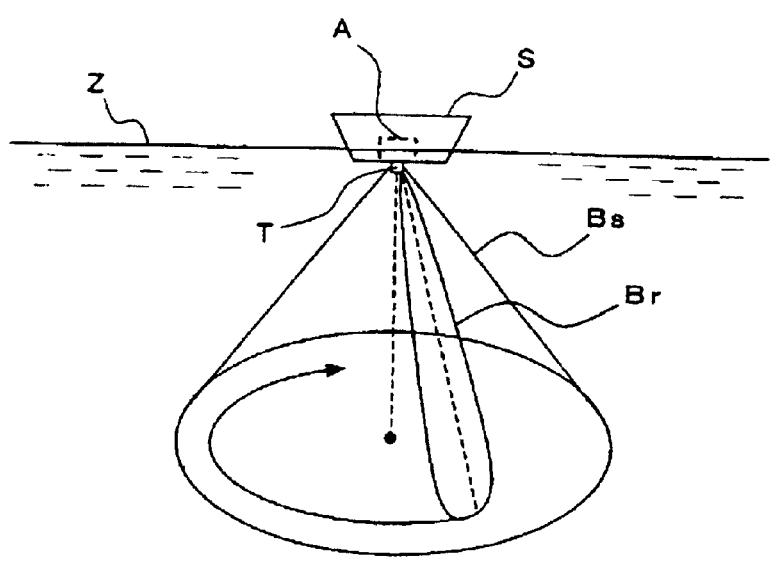
FIG. 12 is a diagram illustrating the principle of underwater sounding by a scanning sonar.

The invention will now described in detail, by way of example, with reference to a scanning sonar according to a preferred embodiment. The principle of ultrasonic underwater sounding by the scanning sonar is not explained here, because it the same as illustrated in FIG. 12. FIG. 1 is a block diagram showing the electrical configuration of the scanning sonar of the invention. The scanning sonar comprises a transducer unit 1, a transmitter 2, a TR circuit 3 as well as a receiver section including blocks 4 to 12. The transducer unit 1 transmits ultrasonic waves into the water and receives reflected echoes. The construction of the transducer unit 1 is conventional, including a plurality of ultrasonic transducer elements arranged on an outer surface of a cylindrical structure. The transducer unit 1 transmits the ultrasonic waves into the water and receives reflected echoes. The transmitter 2 produces a pulsed transmitting signal having a specific pulselength and delivers it to the transducer unit 1. The TR circuit 3 is a circuit for switching signal paths between transmit and receive cycles. Specifically, the TR circuit 3 allows the transmitting signal to pass into the transducer unit 1 while prohibiting the transmitting signal from entering the receiver section during each successive transmit cycle, and permits only the received signals to enter the receiver section during each successive receive cycle.

Designated by the numeral 4 is a first fixed-band bandpass filter, which has a fixed passband, provided in the receiver section. This filter 4 is provided to exclude signals in only a desired frequency range from among echo signals received by the transducer unit 1. Designated by the numeral 5 is an amplifier for amplifying the received signals, which have passed through the fixed-band bandpass filter 4. Designated by the numeral 6 is a frequency converter formed of a mixer for converting the amplified received signals from an original ultrasonic frequency to an intermediate frequency. Designated by the numeral 7 is a second fixed-band bandpass filter having a fixed passband for removing unwanted sideband signal components contained in the frequency-converted signals to further narrow the frequency range of the received signals. Designated by the numeral 8 is an amplifier for amplifying the filtered received signals up to a rated input level of an A/D converter 9 provided in a succeeding stage. The A/D converter 9 converts the amplified received signals into a digital signal. Designated by the numeral 10 is a beamformer for forming a rotating receiving beam, which successively scans the incoming received signals from all directions around the transducer unit T.

Designated by the numeral 11 is an automatic passband controller which constitutes a characteristic part of the invention. Specifically, the automatic passband controller 11 analyzes the center frequency and bandwidth of a combined received signal obtained by the beamforming operation, and limits the frequency range of the signal so that it falls within an effective bandwidth. The automatic passband controller 11 has two outputs, of which one is transmitted to a detector 12 and the other is delivered to a speaker, which is not illustrated. The detector 12 detects an envelope (or a combined echo signal) from the band-limited combined received signal. An output of the detector 12 is sent to an indicator, which is not illustrated. Designated by the numeral 13 is a controller including a central processing unit (CPU) and a memory. Being formed of a transmit-receive controller which is provided as an essential part of the scanning sonar, this controller 13 serves to control both the transmitter 2 and the indicator. Designated by the numeral 14 is an operator terminal provided with keys and switches enabling an operator to enter various settings. Designated by the numeral 15 is a speed sensor for detecting the speed of a ship on which the scanning sonar is installed, and designated by the numeral 16 is a heading sensor for detecting the heading of the ship. Outputs of the operator terminal 14, the speed sensor 15 and the heading sensor 16 are sent to the controller 13.

Figure 10:
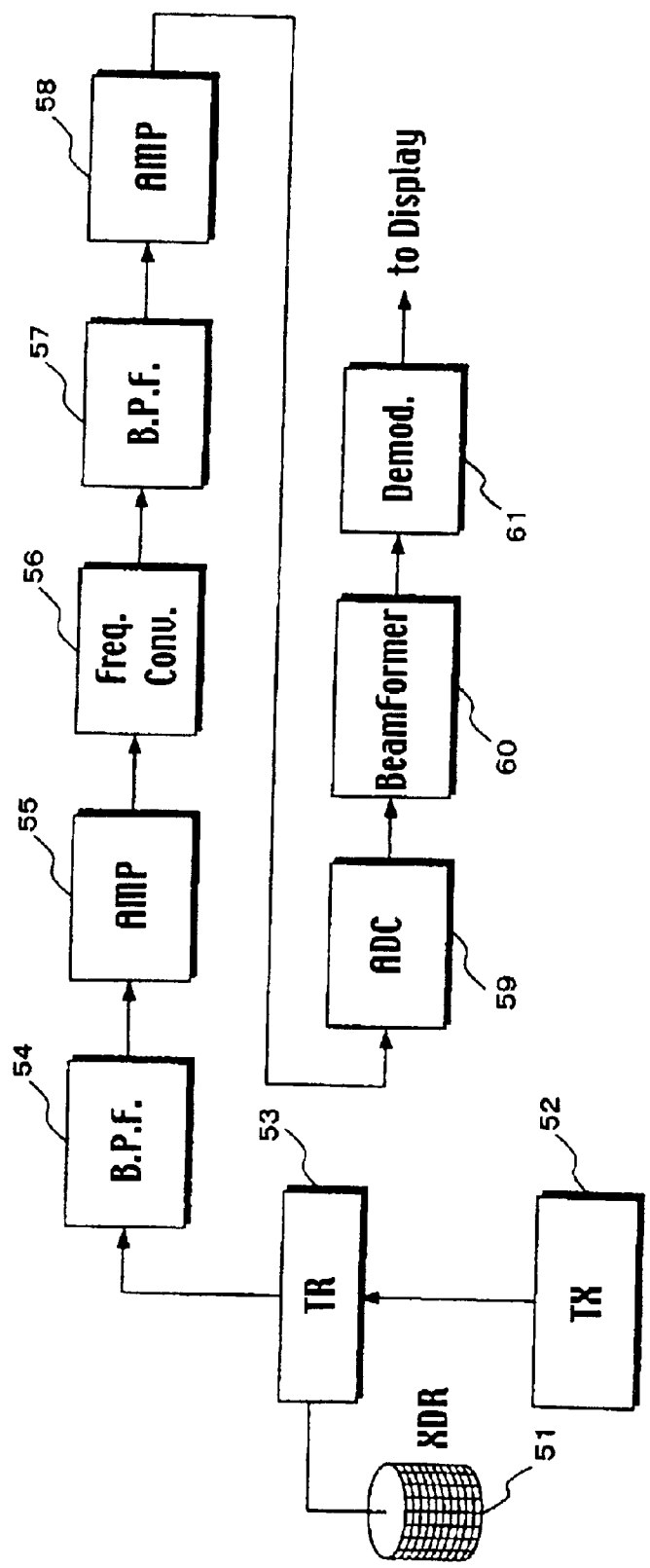
FIG. 10 is a block diagram of a conventional scanning sonar.
Figure 11:
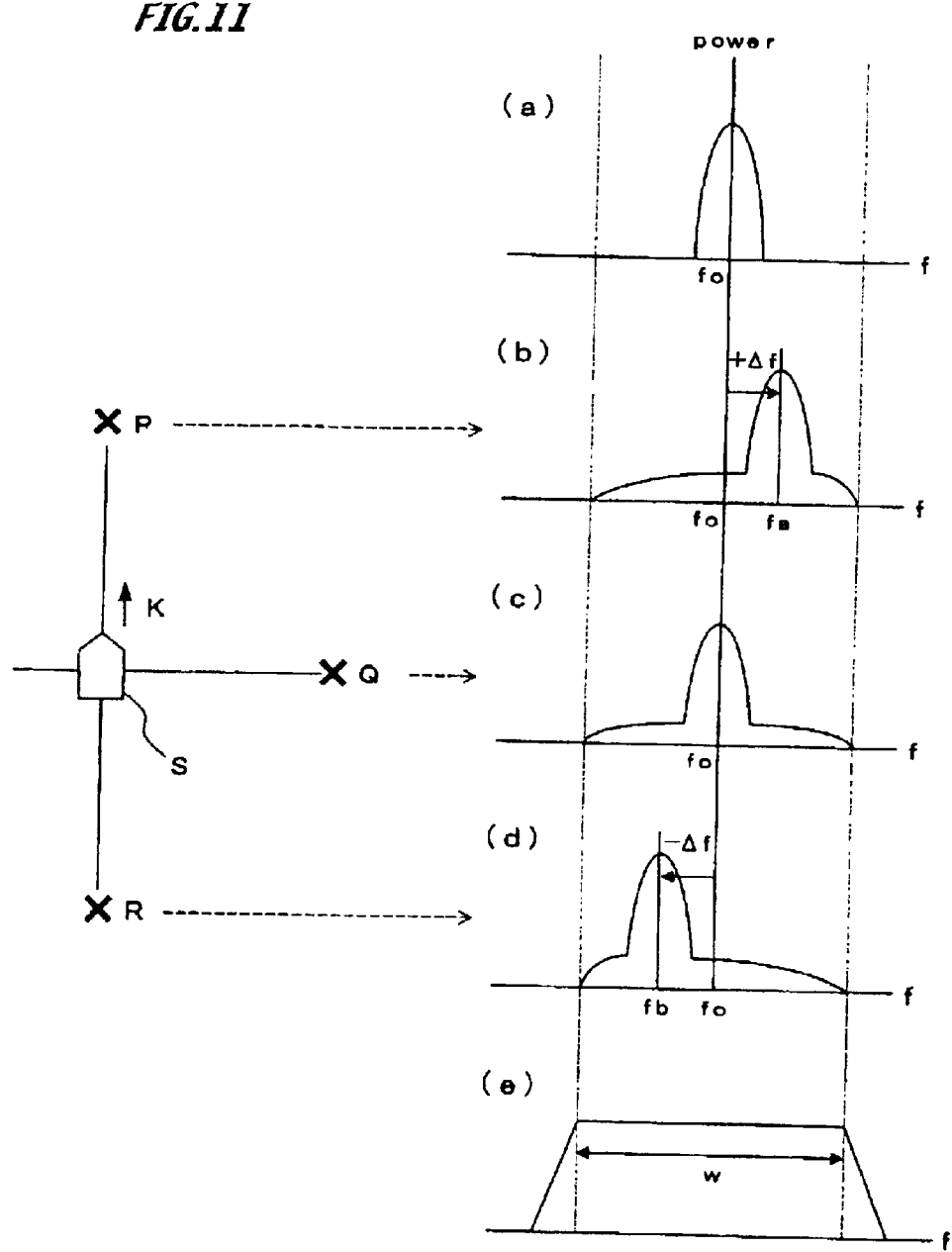
FIG. 11 is a diagram showing how the frequency of a received signal shifts with a change in ship speed.

In the scanning sonar thus constructed, the transmitter 2 supplies the pulsed transmitting signal of a specific frequency to the transducer unit 1 through the TR circuit 3. The transducer unit 1 converts this pulse signal and emits a beam of ultrasonic waves into the water. The transmitted ultrasonic waves are reflected by fish or other underwater objects, and the transducer unit 1 receives reflected echoes. The transducer unit 1 converts ultrasonic echo signals into electric signals, which are sent to the receiver section as received signals. The first fixed-band bandpass filter 4 in the receiver section removes undesired noise components contained in the received signals, allowing signal components falling within only the specific frequency range to pass through. The received signals which have passed through the fixed-band bandpass filter 4 are amplified by the amplifier 5 and converted into IF signals by the frequency converter 6. Then, the second fixed-band bandpass filter 7 removes sideband signal components from the IF signals. The filtered received signals are further amplified by the amplifier 8 and converted into the digital signal by the A/D converter 9. The beamformer 10 forms a receiving beam which is steered over 36° in a spiral pattern. Operation of the scanning sonar thus far described is the same as that of the conventional scanning sonar of FIG. 10.

The combined received signal is sent to the automatic passband controller 11. The automatic passband controller 11 determines the center frequencies and bandwidths of the received signals from individual directions and, based on resultant data, generates a band-limited signal having a high SNR value. This signal is then sent to the detector 12 which detects the envelope of the received signal to reproduce the echo signal. Echo data thus produced is output to the indicator in a succeeding stage. The indicator displays an image of target echoes showing underwater situations on-screen using the data fed from the detector 61. The automatic passband controller 11 also generates an audio signal which is set to the speaker producing an audible sound corresponding to the on-screen underwater situations. Further details of the automatic passband controller 11 will be described later.

Figure 2:
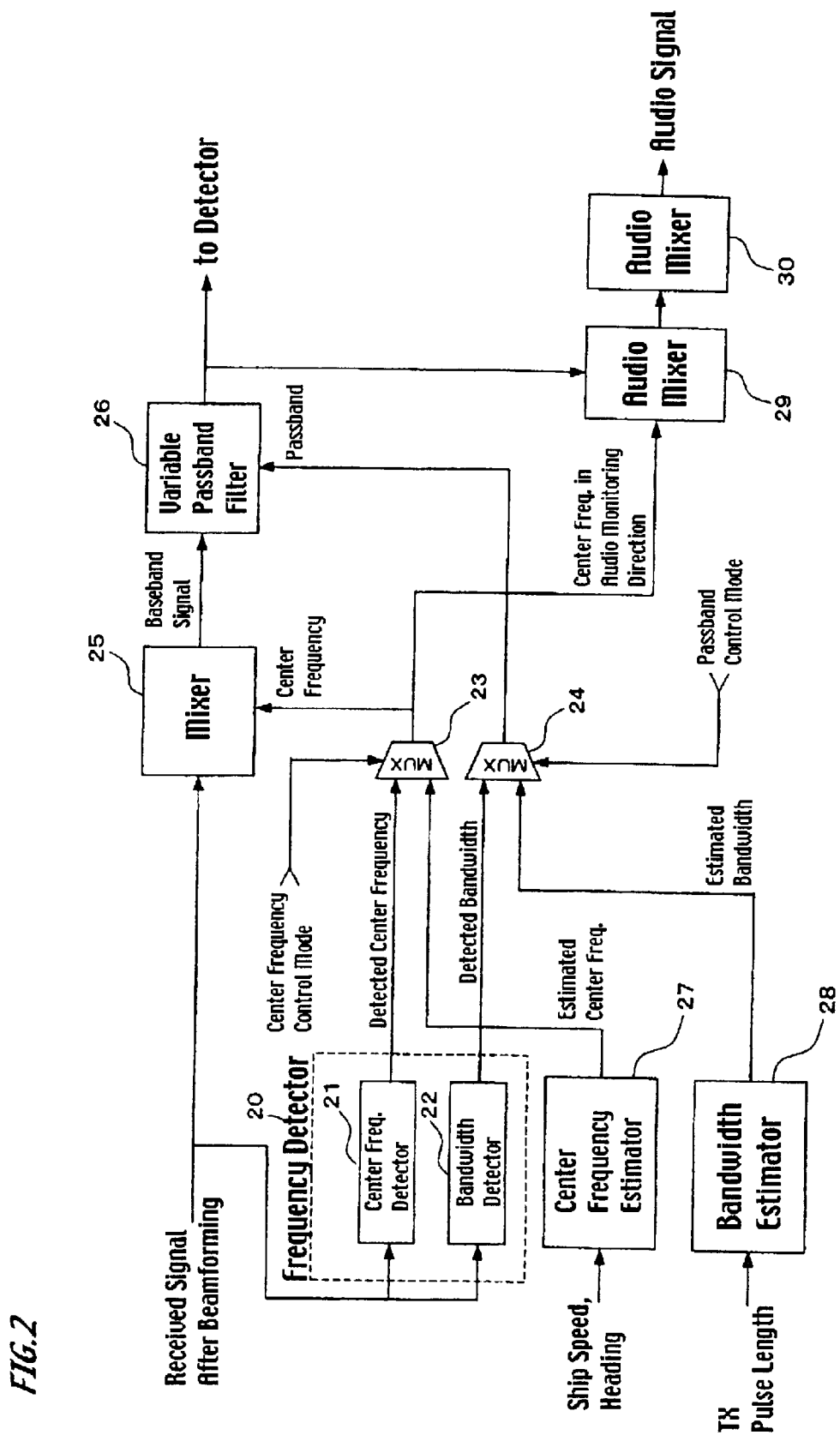
FIG. 2 is a block diagram showing a specific configuration of an automatic passband controller.

FIG. 2 is a block diagram showing a specific configuration of the automatic passband controller 11, in which a frequency detector 20 includes a center frequency detector 21 and a bandwidth detector 22. The center frequency detector 21 determines the center frequencies of the echo signals received from the individual directions (radial directions) from the combined received signal obtained by the beamforming operation and output from the beamformer 10 of FIG. 1. The bandwidth detector 22 determines frequency variances of the echo signals received from the individual directions from the combined received signal obtained by the beamforming operation. The frequency variance represents the degree of the spread, or dispersion, of the frequency. Although it differs from the bandwidth of the received signal, it may be considered generally proportional to the bandwidth.

There exist several methods for real-time detection of the center frequencies and frequency variances of the echo signals. Among them, the present invention employs a complex autocorrelation method. According to the complex autocorrelation method, an average center frequency fd and frequency variance $\sigma^2$ of a received signal expressed by a complex function $Z(t)=I(t)+j \cdot Q(t)$ are calculated by the following equations:

$$fd = \frac{1}{2\pi T}\tan^{-1}\frac{Ri(t)}{Rr(t)} \quad (1)$$

$$\sigma^2 = \frac{2}{T^2}\left(1 - \frac{\sqrt{[Rr(t)]^2 + [Ri(t)]^2}}{\sum_n [I^2(t) + Q^2(t)]}\right) \quad (2)$$

where Rr(t) and Ri(t) are the real and imaginary parts of the autocorrelation function $R(t)=Rr(t)+j \cdot Ri(t)$ expressed by the following equations, respectively:

$Rr(t)=I(t) \cdot I(t-1)+Q(t) \cdot Q(t-1)$, and $Ri(t)=I(t-1) \cdot Q(t)-I(i\ t) \cdot Q(i\ t-1)$.

T in the equations (1) and (2) is sampling frequency of the received signal in the radial direction and n is the number of data obtained from each single direction. The value C obtained as the root of the equation (2) is the standard deviation of the center frequency fd of the received signal. The frequency detector 20 performs mathematical operations expressed by the equations (1) and (2) on the echo signals received from the individual directions to obtain their center frequency fd and frequency variance $\sigma^2$ (bandwidth) for each direction in real time. One approach would be to have the equations (1) and (2) stored in a memory in the form of tables, so that the center frequency fd and frequency variance $\sigma^2$ of the received signal obtained from each direction can be obtained by referring to the tables.

Designated by the numeral 27 is a center frequency estimator, which calculates a Doppler shift frequency based on the ship speed and heading to estimate the center frequency fd of the received signal using the calculated Doppler shift frequency when it is difficult for the center frequency detector 21 to detect the center frequency fd from the received echo signal. In this case, Doppler shift frequencies, which are expected to occur in the echo signals received from all the radial directions, are calculated from ship speed information obtained by the speed sensor 15. The Doppler shift frequency f in a particular radial direction is given by the following equation:

$$\Delta f = \frac{2Vf}{c}\cos\phi \quad (3)$$

where V is the ship speed, f is the frequency of the signal, c is the underwater sound velocity, and $\phi$ is the bearing, which is 0° in the direction of the ship's head, 90° in the starboard direction, 180° in the stern direction, and 270° in the port direction.

The speed sensor 15, which is attached to the ship's hull or to the transducer unit 1, may be an acceleration sensor, for example, whose output provides the ship speed when integrated. It is also possible to use devices such as a global positioning system (GPS) receiver or a current meter, instead of the acceleration sensor, as the speed sensor 15. In the latter case, northward, eastward, southward and westward velocity vectors are converted to forward, rightward, rearward and leftward heading velocity vectors using information obtained from the heading sensor 16. A gyrocompass could be used as the heading sensor 16 in this case.

Designated by the numeral 28 in FIG. 2 is a bandwidth estimator which estimates the bandwidth of the received signal from the pulselength of a transmitting signal applied to the transducer unit 1. Expressing the pulselength of the transmitting signal by $\tau$, the bandwidth of the received signal is substantially equal to $1/\tau$. If $\tau=0.5$ ms, for example, the bandwidth becomes 2 kHz. Strictly speaking, however, the bandwidth of the received signal is not determined by the pulselength of the transmitting signal alone but is affected also by the Doppler effect and beam width. Therefore, the bandwidth of the received signal takes a value larger than $1/\tau$. It is, however, possible to increase the accuracy of estimation of the bandwidth by calculating it using a correction coefficient obtained from the pulselength of the transmitting signal and the tilt angle of the transmitting beam.

The frequency detector 20, the center frequency estimator 27 and the bandwidth estimator 28 described above are incorporated into a single digital signal processor (DSP), and functions of the individual blocks are realized by software.

Designated by the numeral 23 in FIG. 2 is a multiplexer which constitutes a first selector mentioned in the claims of this invention. The multiplexer 23 chooses whether to use the center frequency detected by the center frequency detector 21 or the center frequency estimated from the calculated Doppler shift frequency by the center frequency estimator 27. This choice is made based on a center frequency control mode signal fed from the DSP.

Designated by the numeral 24 in FIG. 2 is a multiplexer which constitutes a second selector mentioned in the claims of this invention. This multiplexer 24 chooses whether to use the bandwidth obtained from the results of detection by the bandwidth detector 22 or the bandwidth estimated by the bandwidth estimator 28. This choice is made based on a passband control mode signal fed from the controller 13.

Designated by the numeral 25 in FIG. 2 is a mixer serving as a frequency shifter which shifts the center frequency of the received signal to obtain a baseband signal according to the center frequency (detected or estimated value) selected by the multiplexer 23. Designated by the numeral 26 is a variable passband filter whose passband is varied according to the bandwidth (detected or estimated value) selected by the multiplexer 24. The variable passband filter 26 limits the bandwidth of the baseband signal output from the mixer 25 according to the passband, which is adjusted to an optimum frequency range. An output signal of the variable passband filter 26 is delivered to the detector 12 as well as to an audio mixer 29 to be described below.

Designated by the numerals 29 and 30 are audio mixers constituting an audio signal generator. The audio mixer 29 takes in the output signal of the variable passband filter 26 and inversely shifts the center frequency of the received signal, which has been picked up from a specified audio monitoring direction and frequency-shifted to its baseband by an amount corresponding to the Doppler shift frequency, according to the center frequency chosen by the multiplexer 23. The audio mixer 30 shifts the center frequency of an output signal of the audio mixer 29 to a frequency range (about 1 kHz) best suited as an audio signal.

Figure 3:
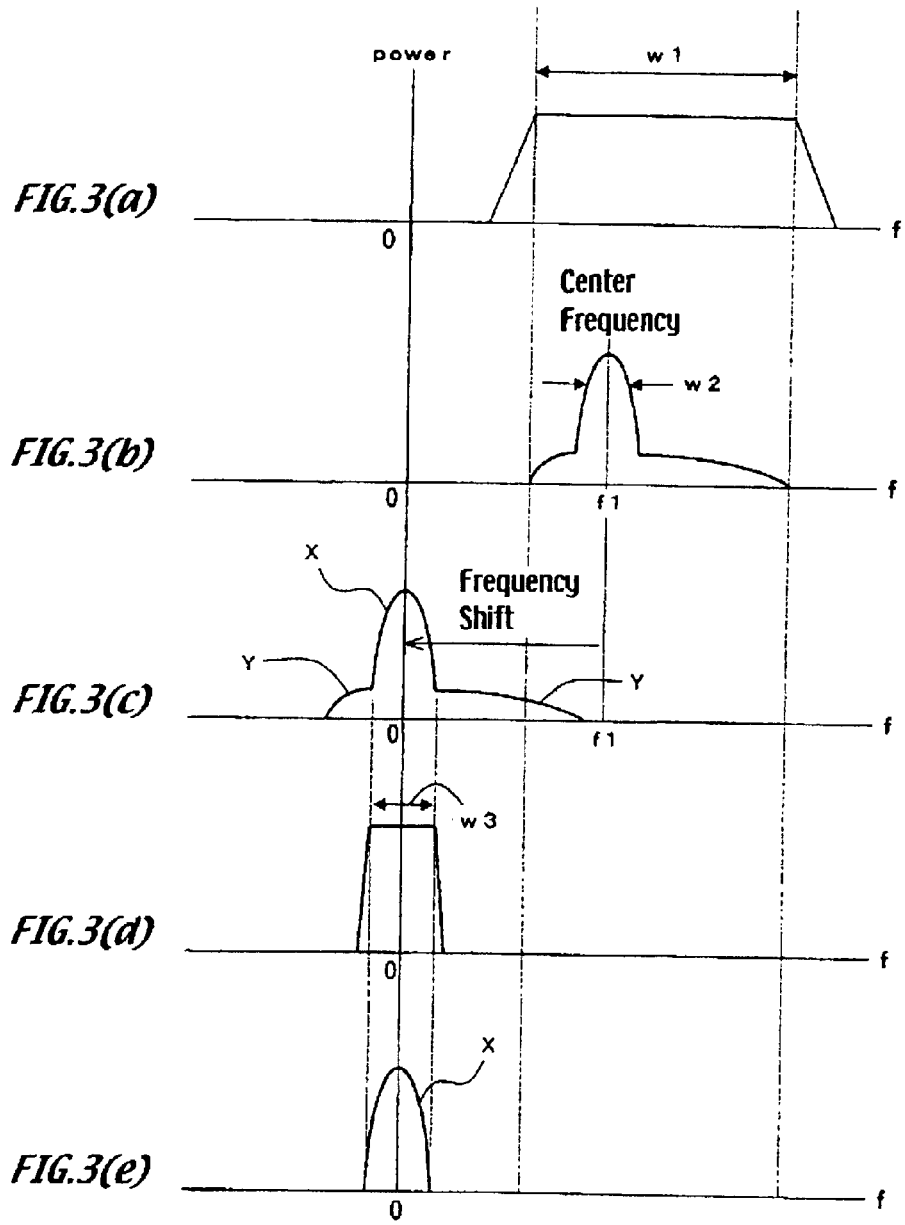
FIG. 3 is a diagram showing frequency spectra of a received signal obtained from a specific direction and filter characteristics.

FIG. 3 is a diagram showing frequency spectra of the received signal obtained from a specific direction and filter characteristics, in which horizontal and vertical axes represent the frequency and filter output, respectively. FIG. 3(i a) shows the characteristics of the second fixed-band bandpass filter 7; FIG. 3(b) shows the spectrum of the received signal input to the automatic passband controller 11; FIG. 3(c) shows the spectrum of the baseband signal, of which center frequency has been shifted by the mixer 25; FIG. 3(d) shows the characteristics of the variable passband filter 26; and FIG. 3(e) shows the spectrum of the received signal output from the automatic passband controller 11.

Operation of the automatic passband controller 11 will now be described in detail. The center frequency detector 21 takes in the combined received signal obtained by the beamforming operation and determines the center frequencies of the echo signals received from the individual radial directions by the aforementioned equation (1) using the complex autocorrelation method. If the received echo signal entered into the center frequency detector 21 has a frequency spectrum as shown in (b) of FIG. 3, its center frequency f1 is calculated by the equation (1). The center frequency f1 thus obtained varies from one direction to another.

The center frequency estimator 27 calculates the Doppler shift frequency f in each individual radial direction based on the ship speed and heading using the equation (3), where f is not obtained from the actual received signal, but is a theoretical (estimated) value calculated based on the ship speed and heading. It is possible to estimate the center frequency f1 from the value fo+f after the value f is determined, where fo is the frequency of the received signal frequency-converted by the frequency converter 6.

Either the center frequency (detected value) obtained by the center frequency detector 21 or the center frequency (estimated value) obtained by the center frequency estimator 27 is selected by the multiplexer 23 according to the passband control mode signal fed from the DSP. More specifically, when the accuracy of the detected value obtained by the center frequency detector 21 satisfies a specified criterion, the value detected by the center frequency detector 21 is selected. When the accuracy of the detected value obtained by the center frequency detector 21 does not satisfy the criterion, the value obtained by the center frequency estimator 27 is selected. A judgment on whether to select the detected value or the estimated value is made by the DSP according to the result of detection by the center frequency detector 21.

In judging whether the accuracy of the detected value obtained by the center frequency detector 21 satisfies the specified criterion, the DSP uses, for example, the frequency variance and power of the received signal calculated by the complex autocorrelation method. The DSP judges whether the frequency variance and power are equal to or better than predefined thresholds for each radial direction, and extracts the center frequencies of the received signals of which frequency variance and power are equal to or better than the predefined thresholds. Then, if the number of data thus extracted is equal to or larger than a specific value, the DSP determines that the accuracy of the detected value satisfies the specified criterion in the relevant radial direction and adopts the extracted center frequency. If the number of data extracted is smaller than the specific value, however, the DSP determines that the accuracy of the detected value does not satisfy the specified criterion in the relevant radial direction and adopts the estimated center frequency. Should there exist aeration (air bubbles) in the wake of another ship that intercepts the ultrasonic waves emitted from the transducer unit 1, for example, the transducer unit I might not be able to receive reflected echoes. In such a case, the number of effective data would decrease, causing the accuracy of the detected value to deteriorate, so that the multiplexer 23 selects the estimated value.

The bandwidth detector 22, on the other hand, takes in the combined received signal obtained by the beamforming operation and determines the frequency variances of the echo signals received from the individual radial directions by the aforementioned equation (2) using the complex autocorrelation method. Since the frequency variance is proportional to the bandwidth as previously stated, it is possible to obtain the bandwidth w2 of the received echo signal shown in (b) of FIG. 3 by determining the frequency variance.

The bandwidth estimator 28 calculates the bandwidth of the received signal based on the pulselength $\tau$ of the transmitting signal. Again, the bandwidth thus calculated is not obtained from the actual received signal but is a theoretical (estimated) value. As previously stated, the approximate bandwidth of the received signal is given by $1/\tau$, from which the bandwidth w2 can be estimated.

Either the bandwidth (detected value) obtained by the bandwidth detector 22 or the bandwidth (estimated value) obtained by the bandwidth estimator 28 is selected by the multiplexer 24 according to the passband control mode signal fed from the controller 13. The scanning sonar of this embodiment allows the operator to preset whether to select the detected value or the estimated value through the operator terminal 14 shown in FIG. 1. The controller 13 controls the multiplexer 24 to select the appropriate value according to the operator setting.

Whichever of the detected value and the estimated value of the center frequency is selected by the multiplexer 23 is transmitted to the mixer 25. The mixer 25 shifts the center frequency of the received signal according to the value (detected or estimated) entered from the multiplexer 23. Specifically, the center frequency f1 of the received signal shown in (b) of FIG. 3 is shifted by an amount corresponding to the detected value or the estimated value fed from the multiplexer 23 as shown in (c) of FIG. 3. Consequently, the received signal is frequency-shifted to its baseband. The baseband signal thus obtained is input to the variable passband filter 26.

On the other hand, whichever of the detected value and the estimated value of the bandwidth is selected by the multiplexer 24 is transmitted to the variable passband filter 26. The passband w3 of the variable passband filter 26 shown in (d) of FIG. 3 varies according to the aforementioned detected value or estimated value. Therefore, the bandwidth of the baseband signal output from the mixer 25 is restricted to an optimum frequency range for the received signal by the variable passband filter 26. As a result, the baseband signal output from the variable passband filter 26 becomes a signal having a high SNR value, as noise components Y shown in (c) of FIG. 3 are removed and only signal components X are allowed to pass through the variable passband filter 26. This eventually enables the indicator to present a clear picture free from sea clutter or other forms of noise.

The output of the variable passband filter 26 is transmitted to the detector 12 as well as to the audio mixer 29. The audio mixer 29 inversely shifts the center frequency of the received signal, which has been picked up from a specified audio monitoring direction and frequency-shifted to its baseband by an amount corresponding to the Doppler shift frequency, to thereby revert the signal to an audio signal shifted by the Doppler shift frequency. The audio mixer 30 further shifts the center frequency of the output signal of the audio mixer 29, which was inversely frequency-shifted by the audio mixer 29, into the frequency range (1 kHz +$\alpha$) best suited as the audio signal. For example, if the Doppler shift frequency is +50 Hz, the center frequency is shifted to 1 kHz+50 Hz, and if the Doppler shift frequency is −20 Hz, the center frequency is shifted to 1 kHz−20 Hz. Also, if the Doppler shift frequency is 0 Hz, the center frequency is maintained at 1 kHz. As a result of frequency shifting, the audio mixer 30 outputs the audio signal centered at approximately 1 kHz, which is sent to the speaker to produce an audible sound enabling the operator to recognize the presence and moving direction of target fish. Since the output signal of the variable passband filter 26 input to the audio mixer 29 has a high SNR value, the audio output of the speaker is clear with minimized noise.

Figure 4:
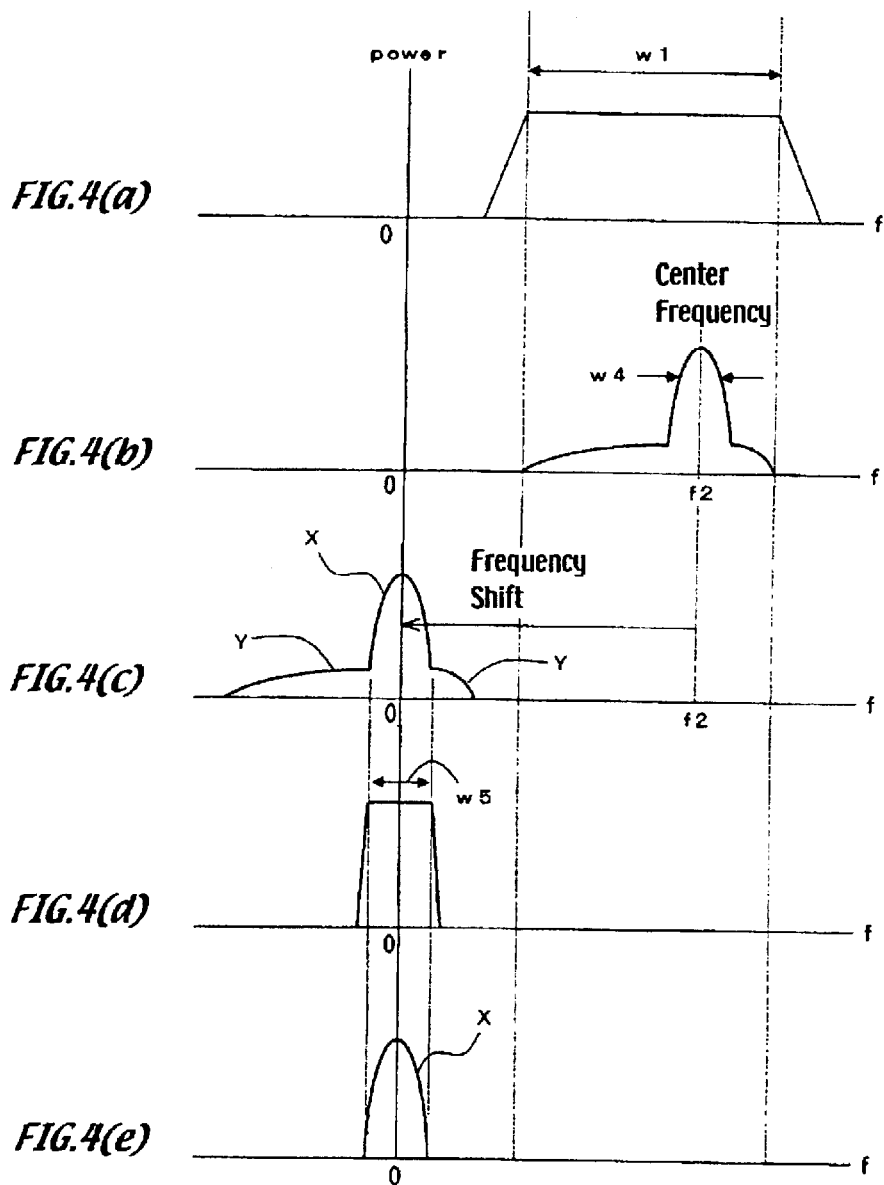
FIG. 4 is a diagram showing frequency spectra of a received signal obtained from another direction and filter characteristics.
Figure 5:
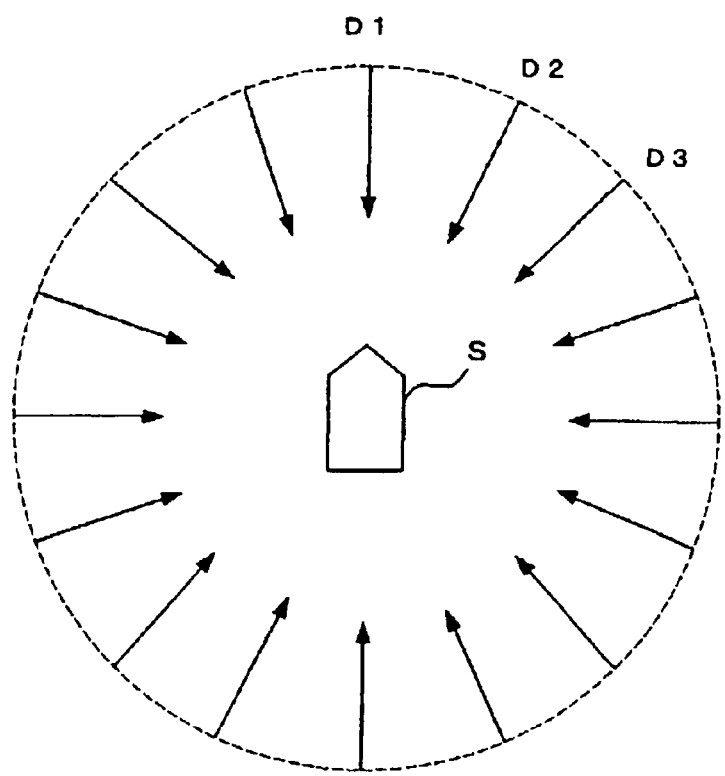
FIG. 5 is a diagram showing directions from which echo signals are received.

While FIG. 3 shows processing of the received signal obtained from the specific direction, the aforementioned operations for frequency shifting and bandwidth adjustment are performed on received signals obtained from other directions by applying the same principle as above. Shown in FIG. 4 is an example in which a center frequency f2 is shifted so that it falls within the baseband of the echo signal received from another direction. Referring to FIG. 4, indicated by w4 and w5 are a bandwidth and a passband corresponding to w2 and w3 of FIG. 3, respectively. Such frequency shifting and bandwidth adjustment operations are performed for one direction after another D1, D2, D3 . . . around the ship S as shown in FIG. 5. It is possible to select a desired number of directions from which echo signals are to be received. For example, this number of directions may be set to 60 to receive echo signals from 60 directions in steps of 6°.

Because the frequency detector 20 determines the center frequencies and bandwidths from the actual received signals in the foregoing embodiment, it is possible to determine the center frequencies and bandwidths caused not only by Doppler shifts directly related to the ship speed, but also by frequency shifts such as those produced by motions of the ship and external factors including tide and waves. Since mathematical operations are performed using the echo signals received by the transducer unit 1, it is not necessary to take in ship speed data from external equipment. Further, even when values detected by the frequency detector 20 cannot be used, it is possible to perform the frequency shifting and bandwidth adjustment operations using estimated values provided by the center frequency estimator 27 and bandwidth estimator 28. Because the frequency shifting and bandwidth adjustment operations are performed on the band-limited combined received signal obtained through the beamforming operation, it is possible to make the passbands w3 and w5 of the variable passband filter 26 considerably narrow, thereby improving the SNR. Furthermore, since the variable passband filter 26 limits the bandwidth of the received signal after shifting the center frequency of the echo signal received from each individual direction, it is possible to control the bandwidths of the echo signals received from all directions over the range of 360° with a single filter. This helps simplify the overall hardware configuration of the scanning sonar.

Figure 6:
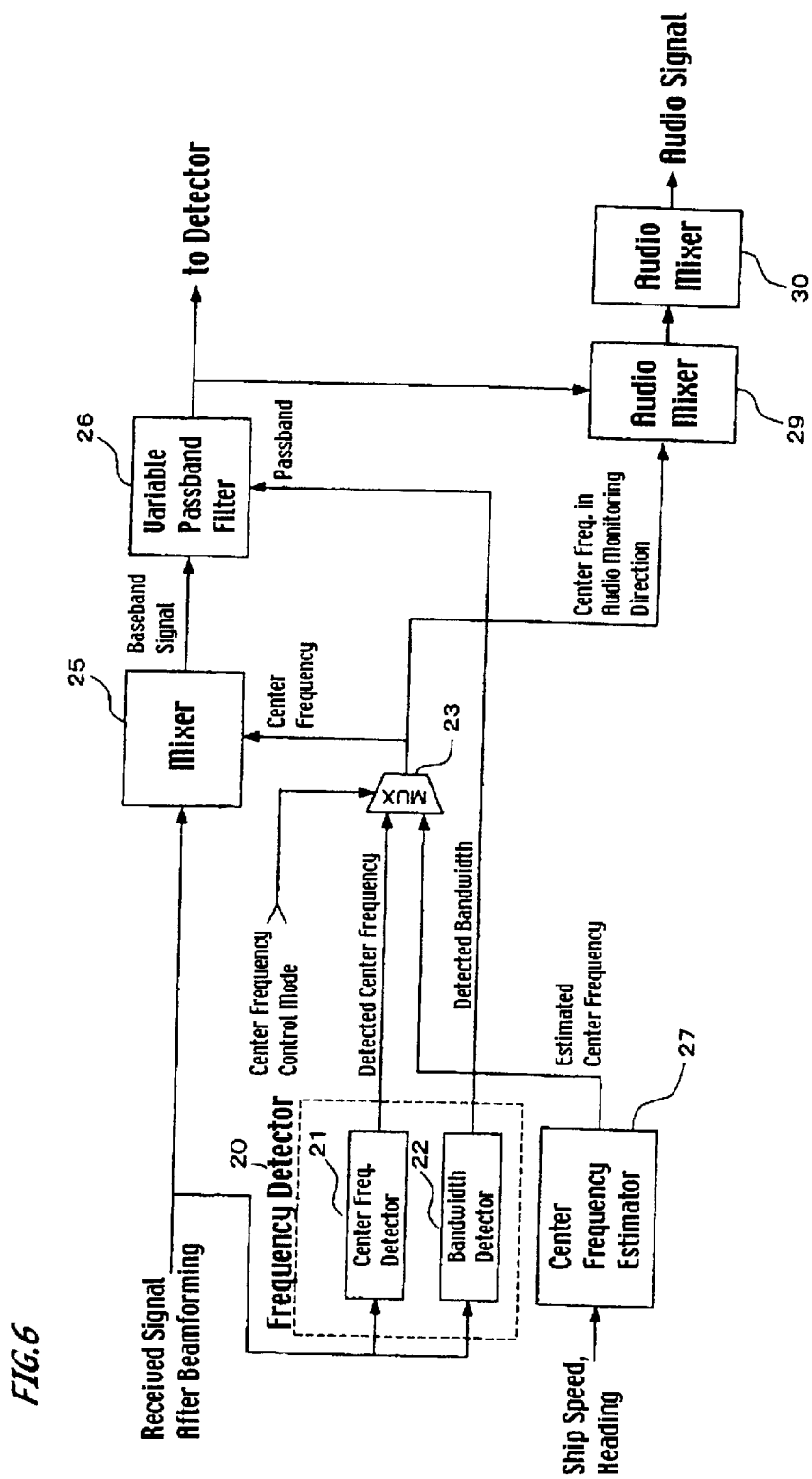
FIG. 6 is a block diagram showing another example of an automatic passband controller.
Figure 7:
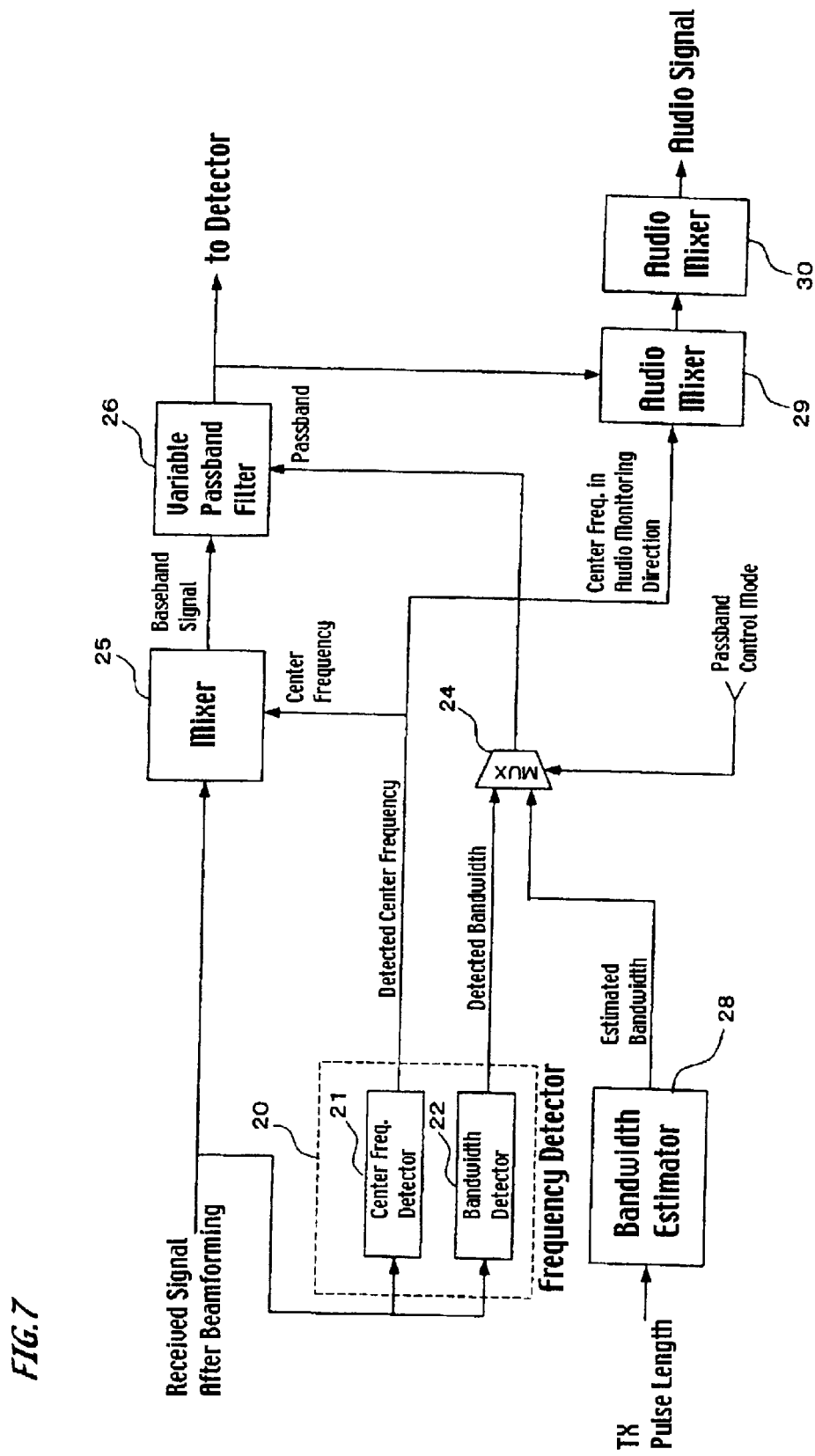
FIG. 7 is a block diagram showing another example of an automatic passband controller.
Figure 8:
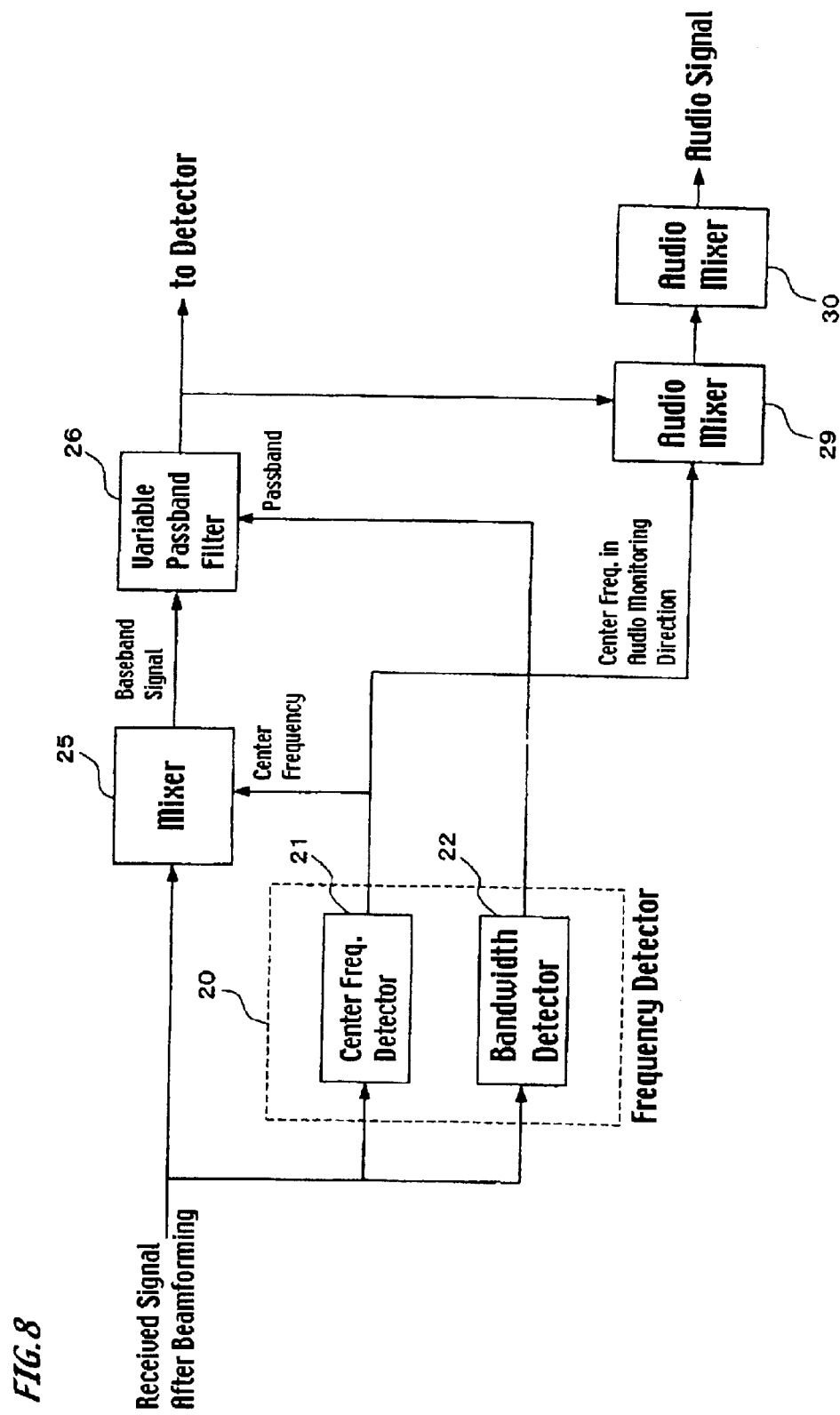
FIG. 8 is a block diagram showing still another example of an automatic passband controller.
Figure 9:
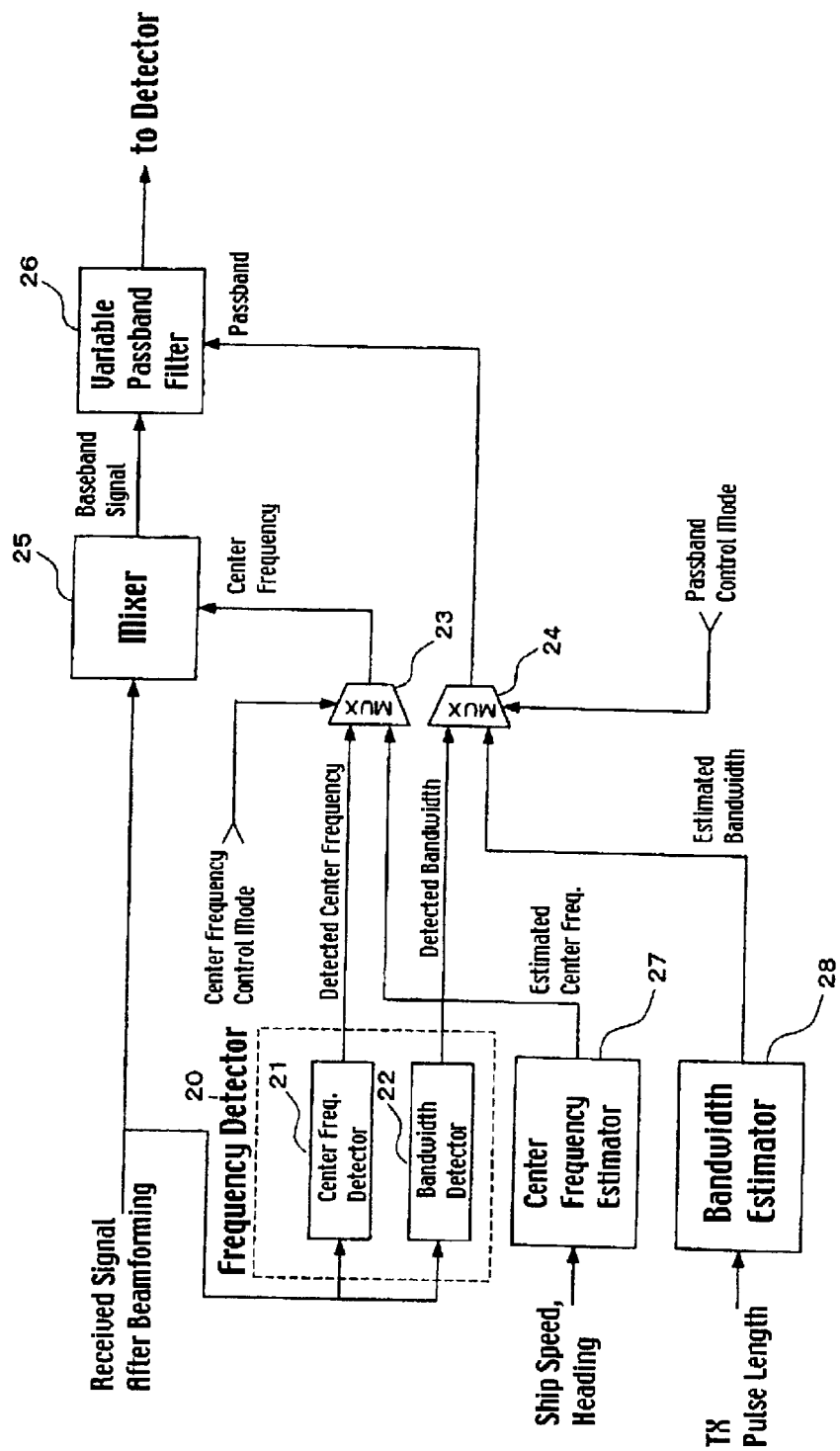
FIG. 9 is a block diagram showing yet another example of an automatic passband controller.

The automatic passband controller 11 need not necessarily include all the blocks shown in FIG. 2; some of those blocks may be omitted. For example, it is possible to eliminate the bandwidth estimator 28 and the multiplexer 24 of FIG. 2 so that the passband of the variable passband filter 26 is adjusted according to only the detected value obtained by the bandwidth detector 22 alone as shown in FIG. 6. Also, the center frequency estimator 27 and the multiplexer 23 of FIG. 2 may be eliminated so that the frequency shifting operation performed by the mixer 25 is controlled only according to the detected value obtained by the center frequency detector 21, as shown in FIG. 7. Furthermore, if it is not necessary to use the detected values, the center frequency estimator 27, it is possible to eliminate the bandwidth estimator 28 and the multiplexers 23 and 24 as shown in FIG. 8. Moreover, if the audio signal is not essentially required, the audio mixers 29 and 30 may be eliminated as shown in FIG. 9. It is also possible to eliminate the audio mixers 29 and 30 in the configurations of FIGS. 6 to 8.

The invention can be embodied in various other forms than described so far. For example, while the frequency detector 20 uses the complex autocorrelation method to determine the center frequency and frequency variance in the foregoing embodiment, the Fourier transform method may be employed instead of the complex autocorrelation method.

Furthermore, while the scanning sonar of the foregoing embodiment operates in horizontal scan mode in which the receiving beam is rotated in a horizontal plane or in an omnidirectional umbrella-like pattern directed obliquely downward, the invention is applicable to a scanning sonar operating in vertical scan mode in which the receiving beam is steered in a vertical plane.

While the invention has been described in connection with the scanning sonar as one of preferred embodiments thereof, it is applicable to various other types of underwater sounding apparatuses, such as an echo sounder (fish finder), a searchlight sonar, an ultrasonic current measuring device, or a depth sounder.

What is claimed is:

1. An underwater sounding apparatus comprising:
    a transducer for transmitting ultrasonic waves into water and receiving ultrasonic echoes reflected from underwater from one or more directions;
    an indicator for outputting information on underwater situations based on received signals obtained from the ultrasonic echoes;
    a center frequency detector for detecting the center frequency of the received signal obtained from each direction;
    a bandwidth detector for detecting the bandwidth of the received signal obtained from each direction;
    a frequency shifter for shifting the center frequency of the received signal obtained from each direction based on the center frequency of the received signal to obtain a baseband signal from the received signal; and
    a variable passband filter whose passband varies according to the bandwidth detected by said bandwidth detector, whereby the bandwidth of the baseband signal is limited by said passband.

2. The underwater sounding apparatus according to claim 1, further comprising:
    a center frequency estimator for calculating a Doppler shift frequency of the received signal based on ship speed and estimating the center frequency of the received signal from the calculated Doppler shift frequency; and
    a selector for choosing whether to use the center frequency detected by said center frequency detector or the center frequency estimated by said center frequency estimator,
    wherein said frequency shifter shifts the center frequency of the received signal obtained from each direction based on the center frequency chosen by said selector to obtain the baseband signal from the received signal.

3. The underwater sounding apparatus according to claim 1, further comprising:
    a bandwidth estimator for estimating the bandwidth of the received signal based on the pulselength of a transmitting signal applied to said transducer; and
    a selector for choosing whether to use the bandwidth detected by said bandwidth detector or the bandwidth estimated by said bandwidth estimator,
    wherein the passband of said variable passband filter varies according to the bandwidth chosen by said selector.

4. The underwater sounding apparatus according to claim 1, further comprising:
    a center frequency estimator for calculating a Doppler shift frequency of the received signal based on ship speed and estimating the center frequency of the received signal from the calculated Doppler shift frequency;
    a bandwidth estimator for estimating the bandwidth of the received signal based on the pulselength of a transmitting signal applied to said transducer;
    a first selector for choosing whether to use the center frequency detected by said center frequency detector or the center frequency estimated by said center frequency estimator; and
    a second selector for choosing whether to use the bandwidth detected by said bandwidth detector or the bandwidth estimated by said bandwidth estimators,
    wherein said frequency shifter shifts the center frequency of the received signal obtained from each direction based on the center frequency chosen by said first selector to obtain a baseband signal from the received signal, and
    the passband of said variable passband filter varies according to the bandwidth chosen by said second selector.

5. The underwater sounding apparatus according to claim 4, wherein said first selector chooses the center frequency estimated by said center frequency estimator when the accuracy of the center frequency of the received signal detected by said center frequency detector for each direction does not satisfy a specific criterion.

6. The underwater sounding apparatus according to claim 4, wherein said second selector chooses the bandwidth according to a setting entered through an operator terminal.

7. The underwater sounding apparatus according to claim 1, further comprising a beamformer which forms a rotating receiving beam for scanning the received signals in an upstream stage of said frequency shifter and said variable passband filter.

8. The underwater sounding apparatus according to claim 1, further comprising an audio signal generator which generates an audio signal from an output signal of said variable passband filter.

9. The underwater sounding apparatus according to claim 8, wherein said audio signal generator includes:
- a first audio mixer for shifting the center frequency of the output signal of said variable passband filter by an amount corresponding to the Doppler shift frequency, wherein the output signal of said variable passband filter corresponds to a received signal, which has been picked up from a specific audio monitoring direction and frequency-shifted to its baseband by said frequency shifter, said first audio mixer inversely shifting the output signal of said variable passband filter with respect to the frequency-shifting of said frequency shifter; and
- a second audio mixer for shifting the center frequency of an output signal of the first audio mixer to a frequency range best suited as an audio signal.

10. The underwater sounding apparatus according to claim 1, wherein said center frequency detector and said bandwidth detector detect the center frequency and the bandwidth of the received signal for each direction in real time using a complex autocorrelation method.

11. An underwater sounding apparatus comprising:
- a transducer for transmitting ultrasonic waves into water and receiving ultrasonic echoes reflected from underwater;
- an indicator for outputting information on underwater situations based on received signals obtained from the ultrasonic echoes;
- a center frequency detector for detecting the center frequency of the received signal without using a measured speed; and
- a frequency shifter for shifting the center frequency of the received signal based on the center frequency detected by said center frequency detector to obtain a baseband signal from the received signal.

12. The underwater sounding apparatus according to claim 11, further comprising:
- a bandwidth detector for detecting the bandwidth of the received signal; and
- a variable passband filter whose passband varies according to the bandwidth detected by said bandwidth detector, whereby the bandwidth of the baseband signal is limited by said passband.

13. The underwater sounding apparatus according to claim 12, further comprising:
- a bandwidth estimator for estimating the bandwidth of the received signal based on the pulselength of a transmitting signal applied to said transducer; and
- a selector for choosing whether to use the bandwidth detected by said bandwidth detector or the bandwidth estimated by said bandwidth estimator, wherein the passband of said variable passband filter varies according to the bandwidth chosen by said selector.

14. The underwater sounding apparatus according to claim 13, wherein said selector chooses the bandwidth according to a setting entered through an operator terminal.

15. The underwater sounding apparatus according to claim 11, further comprising:
- a center frequency estimator for calculating a Doppler shift frequency of the received signal based on ship speed and estimating the center frequency of the received signal from the calculated Doppler shift frequency; and
- a selector for choosing whether to use the center frequency detected by said center frequency detector or the center frequency estimated by said center frequency estimator, wherein said frequency shifter shifts the center frequency of the received signal based on the center frequency chosen by said selector to obtain a baseband signal from the received signal.

16. The underwater sounding apparatus according to claim 15, wherein said selector chooses the center frequency estimated by said center frequency estimator when the accuracy of the center frequency of the received signal detected by said center frequency detector does not satisfy a specific criterion.

17. The underwater sounding apparatus according to claim 11, further comprising a beamformer which forms a rotating receiving beam for scanning the received signals in an upstream stage of said frequency shifter.

18. The underwater sounding apparatus according to claim 12, further comprising an audio signal generator which generates an audio signal from an output signal of said variable passband filter.

19. The underwater sounding apparatus according to claim 18, wherein said audio signal generator includes:
- a first audio mixer for shifting the center frequency of the output signal of said variable passband filter by an amount corresponding to the Doppler shift frequency, wherein the output signal of said variable passband filter corresponds to a received signal, which has been picked up from a specific audio monitoring direction and frequency-shifted to its baseband by said frequency shifter, said first audio mixer inversely shifting the output signal of said variable passband filter with respect to the frequency-shifting of said frequency shifter; and
- a second audio mixer for shifting the center frequency of an output signal of the first audio mixer to a frequency range best suited as an audio signal.

20. The underwater sounding apparatus according to claim 12, wherein said center frequency detector and said bandwidth detector detect the center frequency and the bandwidth of the received signal in real time using a complex autocorrelation method.

21. The underwater sounding apparatus of claim 12, wherein said center frequency detector and said bandwidth detector are operable to detect the center frequencies and bandwidths for each of a plurality of received signal, each received signal corresponding to a different direction.

* * * * *